United States Patent
Jung et al.

(10) Patent No.: US 11,374,234 B2
(45) Date of Patent: Jun. 28, 2022

(54) SEPARATION MEMBRANE COMPLEX AND REDOX FLOW BATTERY

(71) Applicants: LOTTE CHEMICAL CORPORATION, Seoul (KR); Korea Advanced Institute of Science and Technology, Daejeon (KR)

(72) Inventors: Min Suk Jung, Daejeon (KR); Hye Seon Kim, Daejeon (KR); Sang Sun Park, Daejeon (KR); Hee-Tak Kim, Anyang-si (KR); Jaeho Choi, Seongnam-si (KR); Chanyoung Choi, Suwon-si (KR); Taehyuk Kang, Daejeon (KR)

(73) Assignees: LOTTE CHEMICAL CORPORATION, Seoul (KR); Korea Advanced Institute of Science and Technology, Daejeon (KR)

( * ) Notice: Subject to any disclaimer, the term of this patent is extended or adjusted under 35 U.S.C. 154(b) by 22 days.

(21) Appl. No.: 16/648,124

(22) PCT Filed: Sep. 12, 2018

(86) PCT No.: PCT/KR2018/010708
§ 371 (c)(1),
(2) Date: Mar. 17, 2020

(87) PCT Pub. No.: WO2019/054759
PCT Pub. Date: Mar. 21, 2019

(65) Prior Publication Data
US 2020/0235408 A1    Jul. 23, 2020

(30) Foreign Application Priority Data
Sep. 18, 2017  (KR) .................. 10-2017-0119832

(51) Int. Cl.
*H01M 8/0247*    (2016.01)
*H01M 8/1053*    (2016.01)
(Continued)

(52) U.S. Cl.
CPC ....... *H01M 8/0247* (2013.01); *H01M 8/0221* (2013.01); *H01M 8/0228* (2013.01); *H01M 8/1053* (2013.01); *H01M 8/188* (2013.01)

(58) Field of Classification Search
CPC ...... H01M 8/1053; H01M 8/02; H01M 8/188; H01M 8/0247
See application file for complete search history.

(56) References Cited

U.S. PATENT DOCUMENTS

| 4,190,707 A | 2/1980 | Doi et al. |
| 5,304,432 A | 4/1994 | Townsend |

(Continued)

FOREIGN PATENT DOCUMENTS

| CN | 107171010 A | 9/2017 |
| JP | S59205165 A | 11/1984 |

(Continued)

OTHER PUBLICATIONS

International Search Report issued in corresponding International Application No. PCT/KR2018/010708 with English Translation, dated Dec. 19, 2018 (5 pages).

(Continued)

*Primary Examiner* — James Lee
(74) *Attorney, Agent, or Firm* — Osha Bergman Watanabe & Burton LLP

(57) ABSTRACT

The present disclosure relates to a separation membrane complex having an anion exchange membrane and a cation exchange membrane coming in face-to-face contact with each other, and the cation exchange membrane and the anion exchange membrane each having two or more concavities (Continued)

and convexities which interlock with each other in a reverse phase.

4 Claims, 2 Drawing Sheets

(51) Int. Cl.
*H01M 8/0221* (2016.01)
*H01M 8/0228* (2016.01)
*H01M 8/18* (2006.01)

(56) References Cited

U.S. PATENT DOCUMENTS

| | | | |
|---|---|---|---|
| 6,764,789 B1 | 7/2004 | Sekiguchi et al. | |
| 7,959,780 B2 | 6/2011 | Hawkins et al. | |
| 9,799,906 B2 | 10/2017 | Miyake et al. | |
| 2006/0016685 A1* | 1/2006 | Hawkins | C02F 1/4695 204/296 |
| 2010/0028736 A1 | 2/2010 | Unlu et al. | |
| 2012/0178000 A1 | 7/2012 | Unlu et al. | |
| 2012/0263990 A1 | 10/2012 | Kim | |
| 2013/0316268 A1 | 11/2013 | Lee et al. | |
| 2014/0120431 A1 | 5/2014 | Roelofs et al. | |
| 2014/0377687 A1 | 12/2014 | Miyake et al. | |
| 2016/0233531 A1 | 8/2016 | Reece et al. | |

FOREIGN PATENT DOCUMENTS

| | | |
|---|---|---|
| JP | H04228591 A | 8/1992 |
| JP | H06-223858 A | 8/1994 |
| JP | H06223858 A | 8/1994 |
| JP | H06-260183 A | 9/1994 |
| JP | H0992321 A | 4/1997 |
| JP | H11-260390 A | 9/1999 |
| JP | 2001167787 A | 6/2001 |
| JP | 3729386 B2 | 12/2005 |
| JP | 2010132829 A | 6/2010 |
| JP | 201658382 A | 4/2016 |
| JP | 2016532242 A | 10/2016 |
| KR | 100441376 B1 | 7/2004 |
| KR | 101042931 B1 | 6/2011 |
| KR | 20120118333 A | 10/2012 |
| KR | 20120121623 A | 11/2012 |
| KR | 20130025582 A | 3/2013 |
| KR | 101322127 B1 | 10/2013 |
| KR | 20130132107 A | 12/2013 |
| KR | 101359925 B1 | 2/2014 |
| KR | 20140043117 A | 4/2014 |
| KR | 20140098189 A | 8/2014 |
| KR | 20140119598 A | 10/2014 |
| KR | 20150098041 A | 8/2015 |
| KR | 20150132989 A | 11/2015 |
| WO | 2016168360 A1 | 10/2016 |

OTHER PUBLICATIONS

Written Opinion issued in corresponding International Application No. PCT/KR2018/010708, dated Dec. 19, 2018 (4 pages).
Office Action issued in corresponding JP Application No. 2020-513624 with English translation dated Apr. 14, 2021 (8 pages).
Extended European Search Report issued in EP Application No. 18856787.9 dated May 3, 2021 (7 pages).

* cited by examiner

SEPARATION MEMBRANE COMPLEX AND REDOX FLOW BATTERY

CROSS-REFERENCE TO RELATED APPLICATION(S)

This application claims priority to and the benefits of Korean Patent Application No. 10-2017-0119832 filed on Sep. 18, 2017 with the Korean Intellectual Property Office, the disclosure of which is incorporated herein by reference in its entirety.

TECHNICAL FIELD

The present disclosure relates to a separation membrane complex and a redox flow battery. More particularly, the present disclosure relates to a separation membrane complex which can improve the durability when applied to a redox flow battery by using a cation exchange membrane and an anion exchange membrane at the same time, can prevent a crossover phenomenon of active materials charged between an anode electrolyte and a cathode electrolyte, and can improve the efficiency of the battery by controlling the movement of cations/anions, and a redox flow battery including the same.

BACKGROUND ART

Existing power generation systems have various inherent limitations, for example, thermal power generation emitting a large amount of greenhouse gases and environmental pollutions by using fossil fuels, and nuclear power plants entailing their stability issue and hazardous waste processing. In response thereto, research efforts have increased significantly to develop environmentally friendlier, higher efficiency energy sources and a power supply system using the same.

In particular, power storage technology has been the focus of research and development activities for broadening the usability of renewable energy sources against their significant susceptibility to external conditions and for enhancing the efficiency of power utilization, wherein secondary batteries receive more intensive interest and their research and development efforts are being actively undertaken.

A redox flow battery refers to an oxidation/reduction cell capable of converting chemical energy of an active substance directly into electrical energy, and it represents an energy storage system adapted to store new and renewable energy with substantial output variations according to environmental conditions such as sunlight and wind, and to convert the same into high-quality power. Specifically, the redox flow battery has electrolytes containing an active material that causes an oxidation/reduction reaction, and that circulate between opposite electrodes and a storage tank, to perform charging and discharging.

Such a redox flow battery typically includes a tank containing active materials in different oxidized states, a pump for circulating the active materials during charge/discharge, and unit cells partitioned by a separation membrane, wherein the unit cell includes electrodes, an electrolyte, and a separation membrane.

The separation membrane of the redox flow battery is a core material that generates a current flow through the movement of ions generated by the reaction between an anode electrolyte and a cathode electrolyte during charge/discharge. Currently, the redox flow battery generally uses a porous separation membrane for the other secondary battery such as lithium battery, lead-acid battery, and fuel cell, or an ion exchange membrane. However, such previous separation membrane causes a high crossover of active materials charged between the anode electrolyte and the cathode electrolyte, lowers the energy density of the battery and is insufficient in oxidative stability, and thus, there is a limitation in that it is difficult to sufficiently secure the life of the battery.

U.S. Pat. No. 4,190,707 and Korean Patent Registration No. 1042931 disclose microporous separators for alkaline batteries and secondary batteries, but such a conventional porous separation membrane does not suggest a property that can prevent crossover of ions between the anode electrolyte and the cathode electrolyte required in a redox flow battery, or a method capable of securing resistance to bromine.

PRIOR ART LITERATURE

Patent Literature (Patent Literature 1) U.S. Pat. No. 4,190,707
(Patent Literature 2) Korean Patent Registration No. 1042931

DETAILED DESCRIPTION OF THE INVENTION

Technical Problem

It is an object of the present disclosure to provide a separation membrane complex which can improve the durability when applied to a redox flow battery by using a cation exchange membrane and an anion exchange membrane at the same time, can prevent a crossover phenomenon of active materials charged between an anode electrolyte and a cathode electrolyte, and can improve the efficiency of the battery by controlling the movement of cations/anions.

It is another object of the present disclosure to provide a redox flow battery including the aforementioned separation membrane complex.

Technical Solution

In one aspect, there is provided a separation membrane complex having an anion exchange membrane and a cation exchange membrane coming in face-to-face contact with each other, the cation exchange membrane and the anion exchange membrane each having two or more concavities and convexities which interlock with each other in a reverse phase.

In another aspect, there is provided a redox flow battery including the aforementioned separation membrane complex.

Hereinafter, the separation membrane complex and the redox flow battery according to specific embodiments of the present disclosure will be described in more detail.

According to one embodiment of the present disclosure, there can be provided a separation membrane complex having an anion exchange membrane and a cation exchange membrane coming in face-to-face contact with each other, the cation exchange membrane and the anion exchange membrane each having two or more concavities and convexities which interlock with each other in a reverse phase.

The present inventors have conducted research on a separation membrane of a battery, and prepared a separation membrane complex by a process in which two or more concavities and convexities are formed on the substrate surface of the anion exchange membrane (or cation exchange membrane), one surface of the cation exchange membrane (or anion exchange membrane) is formed with concavities and convexities in a reverse phase to those of the anion exchange membrane, and these membranes are combined. As a result, the inventors have found through experiments that such a separation membrane complex can effectively control a crossover of active materials generated during charging, and can greatly improve energy efficiency, voltage efficiency and charge efficiency through the control of the movement of cations and anions, thereby completing the present disclosure.

In the separation membrane complex, even when either the cation exchange membrane or the anion exchange membrane has reduced mechanical strength or chemical stability, the other side of the ion exchange membranes may serve to compensate for this reduction. In addition, due to the structure based on the shape in which the concavities and convexities are interlocked, the bonding force of the two types of ion exchange membranes is greatly enhanced, and thus, the separation membrane complex can have a strong internal structure.

The "reverse phase" of the concavities and convexities means a shape corresponding to the concavities and convexities formed on either the anion exchange membrane or the cation exchange membrane, and for example, the predetermined concavities and convexities and the reverse phase thereof may overlap in contact with the respective concave portions and convex portions.

That is, the anion exchange membrane and the cation exchange membrane in the separation membrane complex may be combined via the concavities and convexities, and the concave portion of the anion exchange membrane and the convex portion of the cation exchange membrane may be combined in contact with each other.

The separation membrane complex may be used for a redox flow battery. The specific type of the redox flow battery is not limited, but for example, it may be a zinc-bromine redox flow battery or a vanadium redox flow battery.

The thickness of the separation membrane complex may vary depending on the capacity or size of the battery used, and for example, it may be in the range of 10 µm to 200 µm, 30 µm to 100 µm, and 40 µm to 80 µm.

The concavities and convexities formed on the surface of the anion exchange membrane may have a height and a width of micro units.

For example, the height of the concavities and convexities defined from the substrate surface of the anion exchange membrane may be 1 µm to 200 µm, or 20 µm to 80 µm.

Further, the width of the fine concavities and convexities defined in the direction parallel to the substrate surface of the anion exchange membrane may be 1 µm to 200 µm, or 20 µm to 80 µm.

The specific shapes of the concavities and convexities formed on the surface of the anion exchange membrane are not particularly limited, and it may be a linear type, a fine protrusion type, a continuous pattern type, etc.

When the concavities and convexities are fine protrusion types, it may have a column portion having the shape of a cylinder, a circular truncated cone, a polygonal column, a polygonal truncated cone, a reverse circular truncated cone or a reversed truncated polypyramid.

Further, when the concavities and convexities are linear, it may be a linear pattern formed by connecting the fine concavities and convexities protruding from the substrate surface of the anion exchange membrane to the outside.

Further, when the concavities and convexities are continuous patterns, it may be a pattern forming a three-dimensional by connecting the entire three-dimensional shapes in which the fine concavities and convexities protruding from the substrate surface of the anion exchange membrane to the outside are protruded to the film outside. A concave portion defined from the sidewall of the fine pattern and the substrate surface of the anion exchange membrane may be formed in the continuous pattern. The cross section of the concave portion with respect to the substrate surface direction of the anion exchange membrane may be circular, elliptical or polygonal.

As the concavities and convexities are formed on the surface of the anion exchange membrane, the bonding strength between the anion exchange membrane and the cation exchange membrane can be increased through the interfacial structure of the cation exchange membrane and the anion exchange membrane, and thus, the separation membrane complex may have a strong internal structure.

If the concavities and convexities are too small in height and width in micro units, the interfacial binding force between the cation exchange membrane and the anion exchange membrane can be lowered, and the stability of the structure of the separation membrane complex may be lowered.

Further, if the concavities and convexities are too high in height and width in micro units, the thickness of the entire separation membrane complex or the thickness of each of the cation exchange membrane and the anion exchange membrane may be increased, thereby increasing the resistance of the separation membrane complex.

The substrate surface of the anion exchange membrane may have a thickness of 1 µm to 200 µm, or 2 µm to 80 µm, or 5 µm to 50 µm. The substrate surface of the anion exchange membrane may perform a role of blocking the crossover of the redox material and a role of a layer supporting the concave and convex structure. By having the above thickness, the crossover suppressing function can be exhibited or the concave and convex structure can be firmly maintained.

The distance between the concavities and convexities adjacent to each other in the anion exchange membrane may be 1 µm to 200 µm, or 20 µm to 80 µm. If the distance between the concavities and convexities adjacent to each other is too small, the mechanical strength of the concave and convex structure can be greatly reduced. Further, if the distance between the concavities and convexities adjacent to each other are too large, the contact surface of the cation exchange membrane and the anion exchange membrane is reduced, the interfacial binding strength is lowered, and the stability of the structure of the separation membrane complex may be lowered.

The other surface of which the concavities and convexities are not formed in the anion exchange membrane may be a flat membrane or may be formed with the concavities and convexities having the same or different shape as the above concavities and convexities.

Meanwhile, as the cation exchange membrane is formed with concavities and convexities in a reverse phase to the concavities and convexities of the anion exchange membrane, the cation exchange membrane may include two or more concavities and convexities in the reverse phase to the concavities and convexities of the substrate surface and the anion exchange membrane.

The size and the like of the concavities and convexities formed on the cation exchange membrane can be defined by the size and the like of the concavities and convexities of the anion exchange membrane.

The separation membrane complex may be prepared by pressing the cation exchange membrane on the anion exchange membrane. In addition, the separation membrane complex may be prepared by coating the raw material of the cation exchange membrane on the anion exchange membrane.

As such, the characteristics of the cationic effect membrane may vary depending on the manufacturing method or the battery applied. For example, the other surface of the substrate surface of the cation exchange membrane which is not in contact with the anion exchange membrane may be a flat membrane or may be formed of the concavities and convexities.

The height, width and spacing of the concavities and convexities formed on the other surface of the substrate surface of the cation exchange membrane may be 10% to 200% of the height, width and spacing of the fine concavities and convexities formed on the anion exchange membrane.

The anion exchange membrane may include a generally known anion polymer. Specifically, the anion exchange membrane may include an anion polymer in which one or more anion exchange functional groups selected from the group consisting of ammonium, phosphonium, and sulfonium are substituted. For example, each of the ammonium, phosphonium, and sulfonium may be substituted with 1 to 4 alkyl groups having 1 to 10 carbon atoms, and more specifically, it can be derived from tri(C1 to C10 alkyl) ammonium, tetra(C1 to C10 alkyl) phosphonium, tri(C1 to C10 alkyl) sulfonium.

Such anionic polymer may have a weight average molecular weight of 10,000 to 500,000. The weight average molecular weight means a weight average molecular weight in terms of polystyrene measured by GPC method.

A more specific example of the anionic polymer include one or more polymers selected from the group consisting of perfluoro-based polymers, benzimidazole-based polymers, polyimide-based polymers, polyetherimide-based polymers, polyphenylene sulfide-based polymers, polysulfone-based polymers, polyetherketone-based polymers, polyethersulfone-based polymers, polyether ketone-based polymers, polyether-etherketone-based polymer, and polyterylquinoxaline-based polymers, which are substituted with one or more anion exchange functional group selected from the group consisting of ammonium, phosphonium and sulfonium.

The cation exchange membrane may include a generally known cationic polymer. Specifically, the cation exchange membrane may include a cationic polymer in which one or more cation exchange functional groups selected from the group consisting of a sulfonic acid group, a carboxyl group and a phosphoric acid group are substituted.

Such cationic polymers may also have a weight average molecular weight of 10,000 to 500,000. The weight average molecular weight means a weight average molecular weight in terms of polystyrene measured by GPC method.

More specifically, the cation exchange membrane may include one or more polymers selected from the group consisting of sulfonated tetrafluoroethylene-based polymer, sulfonated polyimide (sPI), sulfonated poly(arylene ether sulfone) (sPAES), sulfonated polyetheretherketone (sPEEK), sulfonated polyetherketone (sPEK), poly(vinylidene fluoride)-graft-poly(styrene sulfonic acid) (PVDF-g-PSSA) and sulfonated poly(fluorenyl ether ketone).

The cation exchange membrane may include a sulfonated tetrafluoroethylene-based polymer, and among them, Nafion™, commercially available from Dupont, may be used.

Meanwhile, according to another embodiment of the present disclosure, there can be provided a redox flow battery including the separation membrane complex.

The redox flow battery may be a zinc-bromine redox flow battery or a vanadium redox flow battery.

The redox flow battery may include a unit cell including the separation membrane complex (separator) and an electrode, a tank in which active materials having different oxidation states are stored, and a pump for circulating the active material between the unit cell and the tank during charge/discharge.

The details regarding the separation membrane includes the content described above with respect to the embodiment.

Advantageous Effects

According to the present disclosure, there can be provided a separation membrane complex which can improve the durability when applied to a redox flow battery by using a cation exchange membrane and an anion exchange membrane at the same time, can prevent a crossover phenomenon of active materials charged between an anode electrolyte and a cathode electrolyte, and can improve the efficiency of the battery by controlling the movement of cations/anions, and a redox flow battery including the same.

DETAILED DESCRIPTION OF THE EMBODIMENTS

Hereinafter, the present disclosure will be described in more detail with reference to examples. However, these Examples are presented only to illustrate the invention and the scope of the present disclosure is not limited thereto.

Example 1

An anion exchange resin (trimethylammonium functionalized polysulfone) was spin-coated on a silica mold that had been subjected to a hydrophilic treatment through a process such as plasma at 3000 rpm for 60 seconds. It was dried at a temperature of 80° C. for 3 hours, and the silicon mold coated with the anion exchange resin was impregnated with deionized water to obtain an anion exchange resin membrane.

At this time, in the anion exchange resin film, a plurality of concavities and convexities were formed on the substrate surface having a thickness of about 10 µm at a height of about 40 µm and a spacing of about 20 µm.

Then, a 25 µm thick Nafion (Nafion D520, DuPont) was placed on the anion-exchange resin film on which the concavities and convexities were formed, and thermally pressed at a temperature of 130° C. under a pressure of 5 atm to prepare a separation membrane complex.

Comparative Example 1

A 50 μm thick Nafion (Nafion 212, DuPont) separation membrane was used.

Experimental Example: Evaluation of Charge/Discharge Performance

Figure 2:
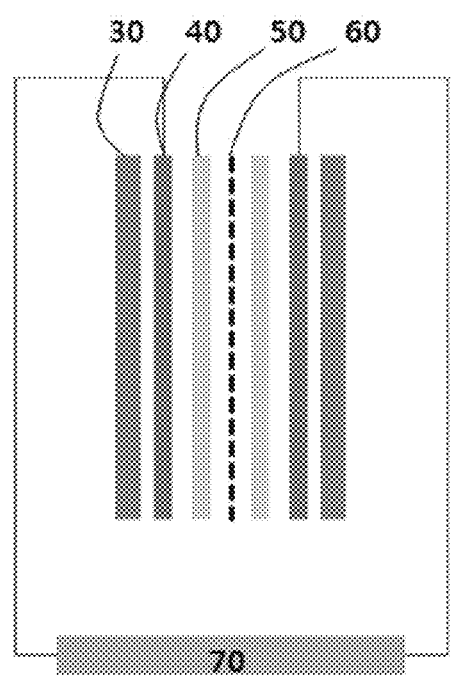
FIG. 2 is a schematic diagram of a unit cell for confirming the performance of the separation membrane complex of Example 1 and Comparative Example 1.

In order to confirm the performance of the separation membrane of Example 1 and Comparative Example 1, a unit cell was prepared as shown in FIG. 2. The unit cell is composed of a flow frame 50 for forming a flow path so that the electrolyte can move symmetrically to the separation membrane 60, an electrode 40 for moving electrons, and an end plate 30 that serves to maintain a unit cell shape and plays a role as a support. The electrolyte in the electrolyte container was supplied to the unit cell via a pump, and an electric current was applied through a charging/discharging device 70 so that charging and discharging were performed.

As the electrolyte solution stored in the electrolyte container, a solution in which 1.5M $VOSO_4$ was dissolved in 3M $H_2SO_4$ aqueous solution was used. The electrolyte used an anode and a cathode in an amount of 40 ml, respectively, and the electrolyte supplied from an electrolyte circulating pump was supplied at a rate of 40 ml/min. In addition, the anode electrolyte was used as a V(+4)/V(+5) redox couple, and the cathode electrolyte was used as a V(+2)/V(+3) redox couple.

With respect to the unit cells prepared by the separation membranes of Example 1 and Comparative Example 1, one stripping after one charge/discharge process was set to 1 cycle, and the energy efficiency, voltage efficiency and charge efficiency were measured. The results are shown in Table 1 below. At this time, the voltage efficiency [VE, the calculation method is the average discharge voltage (V)/average charge voltage (V)] was measured by dividing the average charge voltage and the average discharge voltage, and the energy efficiency (EE, the calculation method is the charge output amount (Wh)/discharge output amount (Wh)) was measured by dividing the charge output amount and the discharge output amount.

At this time, Wonatec product was used as a charge/discharge device, and the measurement was performed under the conditions of room temperature, total charge of the system of 1.6 Ah, charge/discharge voltage range of 0.8 to 1.6 Ah, charge of 80 mA/cm$^2$, discharge of 80 mA/cm$^2$, and voltage of less than 0.01V.

TABLE 1

| Unit: %<br>(28 cycle average) | Energy efficiency | Voltage efficiency | Charge efficiency |
|---|---|---|---|
| Example 1 | 81.77 | 83.01 | 98.49 |
| Comparative Example 1 | 69.77 | 78.15 | 89.39 |

Figure 1:
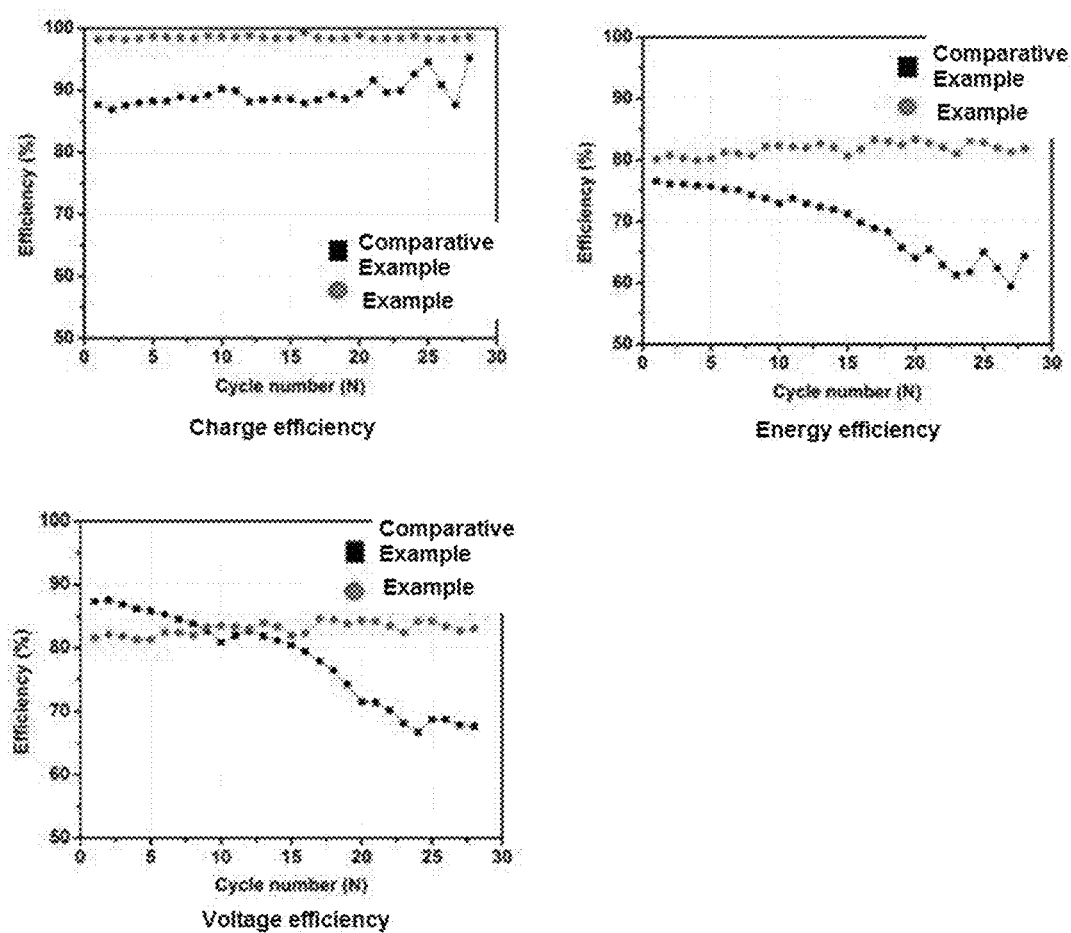
FIG. 1 is a graph showing the results of evaluation of the charge and discharge performance of a unit cell including the separation membrane complex of Example 1 and Comparative Example 1.

As shown in Table 1 and FIG. 1, it was confirmed that the unit cell including the separation membrane of Example 1 was significantly superior in energy efficiency, voltage efficiency, and charge efficiency compared to the unit cell including the separation membrane of Comparative Example 1.

DESCRIPTION OF SYMBOLS

30: end plate
40: electrode
50: flow frame
60: separation membrane
70: charge/discharge device

The invention claimed is:

1. A separation membrane complex having an anion exchange membrane and a cation exchange membrane coming in face-to-face contact with each other, the cation exchange membrane and the anion exchange membrane each having two or more concavities and convexities which interlock with each other in a reverse phase,
   wherein a height of the concavities and convexities of the anion exchange membrane is 20 μm to 80 μm,
   wherein a width of the concavities and convexities of the anion exchange membrane is 20 μm to 80 μm,
   wherein the distance between the concavities and convexities adjacent to each other in the anion exchange membrane is 20 μm to 80 μm.

2. The separation membrane complex of claim 1, wherein the separation membrane complex is used for a redox flow battery.

3. The separation membrane complex of claim 1, wherein the anion exchange membrane includes an anion exchange polymer in which one or more anion exchange functional groups selected from the group consisting of ammonium, phosphonium and sulfonium are substituted.

4. The separation membrane complex of claim 1, wherein the cation exchange membrane includes a cationic polymer in which one or more cation exchange functional groups selected from the group consisting of a sulfonic acid group, a carboxyl group and a phosphoric acid group are substituted.

* * * * *